(12) United States Patent  (10) Patent No.: US 7,953,274 B2
Sara et al.  (45) Date of Patent: May 31, 2011

(54) DIGITAL METHOD FOR MATCHING STAINS

(75) Inventors: Paul Sara, Cary, IL (US); Robert W Springate, Belvidere, IL (US); Sanford Lee Hertz, Hoffman Estates, IL (US); Andrew Ubel, Saint Paul, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 1064 days.

(21) Appl. No.: 11/365,472

(22) Filed: Mar. 1, 2006

(65) Prior Publication Data

US 2006/0210153 A1  Sep. 21, 2006

Related U.S. Application Data (60) Provisional application No. 60/663,294, filed on Mar. 18, 2005.

(51) Int. Cl.
*G06K 9/00* (2006.01)
(52) U.S. Cl. ............ 382/165; 356/300; 356/402; 427/8; 702/81; 700/123
(58) Field of Classification Search .................. 382/162, 382/165; 356/300, 402; 427/8; 700/123; 702/81
See application file for complete search history.

(56) References Cited

U.S. PATENT DOCUMENTS

| 5,844,542 | A * | 12/1998 | Inoue et al. ................... 345/594 |
| 6,502,049 | B1  | 12/2002 | Takada et al. |
| 6,556,303 | B1 * | 4/2003 | Rangarajan et al. .......... 356/446 |
| 6,641,696 | B1 * | 11/2003 | Edgerton ...................... 156/277 |
| 6,744,513 | B2  | 6/2004  | Kubo et al. |
| 7,116,420 | B2 * | 10/2006 | Skierski et al. ............... 356/408 |
| 7,230,707 | B2  | 6/2007  | Ingleson et al. |
| 7,430,316 | B2 * | 9/2008 | Boston et al. ................ 382/162 |
| 2004/0093112 | A1 | 5/2004 | Marchand et al. |
| 2004/0131756 | A1 | 7/2004 | Skierski et al. |

(Continued)

FOREIGN PATENT DOCUMENTS

CN  2340001 Y  9/1999

(Continued)

OTHER PUBLICATIONS

Lebow et al.; "Classification of wood surface features by spectral reflectance"; Jan. 1996, Wood and Fiber Science, 28(1), 1996, pp. 74-90.*

(Continued)

*Primary Examiner* — Vikkram Bali
*Assistant Examiner* — Eueng-Nan Yeh
(74) *Attorney, Agent, or Firm* — IPLM Group, P.A.

(57) ABSTRACT

An apparatus and method for preparing a stain to match a target color of a selected substrate (e.g., wood species). The apparatus may include a computer and hardware and/or software to store a database of stain records, create or load spectral data (e.g., a digital image) of a target sample, and display images and/or process spectral data. The apparatus may facilitate stain selection, and may also dispense colorant agents and/or vehicles to create stains. The apparatus may be used in a "manual" mode (whereby a human compares database and target images and makes a selection); an "automatic" mode (whereby the computer suggests a match based on the selected substrate); or a "combination" mode (whereby the computer suggests a match and the user can then compare the suggested match with various images to achieve a final selection).

36 Claims, 5 Drawing Sheets

U.S. PATENT DOCUMENTS

2004/0223149 A1    11/2004    Skierski et al.

FOREIGN PATENT DOCUMENTS

| | | |
|---|---|---|
| FR | 2 698 982 | 6/1994 |
| JP | 11 269411 A | 5/1999 |
| JP | 11-269411 A | 10/1999 |
| JP | 11 269411 A | 1/2000 |

OTHER PUBLICATIONS

International Search Report for PCT/US2006/009845.
International Search Report mailed Jul. 27, 2006 for PCT/US2006/009845.
"Blue Stain", U.S. Department of Agriculture, Forest Service, Forest Products Laboratory, 2 pages, (May 2002).

* cited by examiner

DIGITAL METHOD FOR MATCHING STAINS

CROSS-REFERENCE TO RELATED APPLICATION

This application claims priority from U.S. provisional patent application Ser. No. 60/663,294, filed Mar. 18, 2005, which is incorporated herein by reference.

TECHNICAL FIELD

The present invention relates to color matching and, more specifically, an apparatus and method for preparing a stain that when applied to a selected substrate (e.g., a wood stain applied to a selected wood species) will match a target color.

BACKGROUND

Paints and stains are often used to protect and/or decorate a surface. Stains are transparent or semitransparent solutions or suspensions of coloring agents (such as, for example, dyes or pigments and the like) in a vehicle, and typically are designed to color a surface without hiding it or leaving a continuous film. As a result, the stained substrate (typically a species of wood) is colored, but the grain pattern is generally not hidden. In contrast, paints are usually opaque solutions or suspensions of coloring matter in a carrier, designed to hide or cover a surface with an opaque film.

Computerized color matching techniques using spectrophotometers are used with paints. However, the use of computerized color matching techniques with transparent or semitransparent stains has not been successful, due to the transparent or semitransparent nature of stains, the wide variety of available substrates (e.g., wood species, each of which imparts its own contribution to the color), and the variations of color within even a single substrate sample.

Instead, transparent or semitransparent stains are conventionally color matched, if at all, using a trial-by-error method. In one such trial-by-error method, a colorist inspects the color of the stain standard and then guesses regarding the pigments and relative concentrations of same necessary to provide a color matching stain. A stain is then prepared based on the pigment and concentration guesses. The stain is applied to a substrate and then the stained substrate is compared to the stain standard. If the visual inspection indicates that the stain standard and the stained substrate do not match, the colorist guesses at the amount of pigments to add to the stain and the new stain is applied to the substrate. These steps are repeated until the colorist determines that there is a color match. As can be appreciated, such a trial-by-error method is tedious and relies upon the skill of the colorist for its effectiveness.

The aforementioned method is not at all practical for do-it-yourselfers, mass merchants or home center staffs. Instead, the customer is usually required to select the closest "color" from a very limited palette of pre-mixed stains. For example, color matching may be conducted by comparing a stained article (target) to a limited number of colored samples, usually between about 15 and about 20, on a display rack having a very limited selection of substrates. The limited choices are often not close enough for good color matching; resulting in a very unsatisfactory experience for many customers. Moreover, the differences in the base color (background) of different substrates (e.g., wood species) make it difficult to obtain good matching of a color of the stain on different substrates or types of wood.

Accordingly, there is a need in the art for an improved method of color matching transparent or semitransparent stains and an apparatus that can select, suggest, and/or prepare an accurate color match for stains for different substrates, e.g., different wood species. The present invention is directed to such a method and apparatus.

SUMMARY

The present invention provides an apparatus and method for selecting; suggesting and/or preparing a wood stain to color a wood species to match a target color.

In one embodiment, the method comprises the step of providing a computer system that contains a database of stain information, wherein the database preferably contains a plurality of records associated with stains, each record including: (i) a stain formula representing a stain, and (ii) at least one of: (a) a digital color image depicting the stain as applied to one or more substrates; and (b) spectral data for the stain as applied to one or more substrates. The method also comprises the steps of: obtaining at least one of (a) a digital color image of a target object and (b) spectral data of a target object; specifying a substrate to be stained; and selecting a desired stain and associated formula by comparing at least one of (a) the digital color image of a target object and (b) the spectral data of a target object to the database records associated with the specified substrate.

In another embodiment, the method comprises the step of providing a computer system that includes a color monitor and contains a database of stain information, wherein the database preferably contains a plurality of records associated with stains, each record including: (i) a stain formula representing a stain, and (ii) at least one of: (a) a digital color image depicting the stain as applied to one or more substrates; and (b) spectral data for the stain as applied to one or more substrates. The method also comprises the steps of: specifying a substrate to be stained; displaying on the monitor at least one of (i) the digital color image of a stain record for the selected substrate and (ii) a color image representing the spectral data of the stain for the selected substrate; and selecting a desired stain and associated formula by comparing a target object to the displayed record image.

In one embodiment, the apparatus includes data (e.g., spectral data, colored digital images, etc.) for a plurality of colored stains as applied to a plurality of included substrates (e.g., wood species); a device (or devices) for displaying, measuring and/or imaging the target color; and a processor configured to suggest or facilitate the selection of the formula for a stain as applied to a specified substrate. The apparatus may be configured to execute a set of instructions to dispense at least one ingredient (e.g., colorant composition) to prepare a liquid stain designed to closely match the target color on the selected substrate. The apparatus can provide stains based on predetermined formulas for specific stain colors, or in preferred embodiments it may provide custom stain colors.

In another embodiment, the apparatus includes data (e.g., spectral data, colored digital images, etc.) for a plurality of colored stains as applied to a plurality of included substrates; and a device (or devices) for displaying the colored digital images. A user may compare a physical target specimen to the displayed images, and in preferred embodiments a processor is configured to facilitate the selection of the formula for a stain as applied to a specified substrate.

In one embodiment, the apparatus includes a database containing data for a variety of colored stains as applied to a plurality of substrates (e.g., wood species). The system can determine or facilitate the determination of the amount of colorant agent required to prepare a stain to color a specific substrate to match a target color. The target color can be a stained wood species which can be the same or different than the selected substrate (e.g., wood species).

In one embodiment, an untinted stain carrier is provided in a container (e.g., a can) and the apparatus can dispense suitable colorant composition into the container to tint the stain to a desired color. Alternatively, the apparatus can include one or more carriers for stains and dispense the carriers into a container. An advantage of the apparatus of the invention is that it allows for the accurate preparation of small tinted stain samples, e.g., from about 2 to 4 ounces (57 to 114 ml), as well as larger amounts. Regardless of size, the stains can be prepared with a high degree of accuracy that will allow accurate color matching.

The above summary of the present invention is not intended to describe each disclosed embodiment or every implementation of the present invention. The details of one or more embodiments of the invention are set forth in any accompanying drawings and the description below. Other features, objects, and advantages of the invention will be apparent from the description and drawings, and from the claims.

DEFINITIONS

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a stain that comprises "a" pigment can be interpreted to mean that the stain includes "one or more" pigments.

As used herein, the recitations of numerical ranges by endpoints include all numbers subsumed within that range (e.g., 1 to 5 includes 1, 1.5, 2, 2.75, 3, 3.80, 4, 5, etc.).

As used herein, the term "stain" refers to a transparent or semitransparent solution or dispersion of coloring matter (such as of one or more pigments, colorants, tinting agents, dyes and/or metal effect agents), plus various optional stain additives (e.g., fillers and extenders) in a vehicle (e.g., binder and thinner). Wood stains can be oil-based or water-based. Typically, a stain is transparent or semitransparent and designed to color a substrate such as a piece of wood without totally hiding it or leaving an opaque film. Stains usually will have low solid content relative to paint, e.g., frequently the solids can be less than about 20 percent by weight. The term "stain" also refers to "varnish stains" or "one step stain coatings," i.e., a product that can provide both a color (stain) to the wood and a finish coating in a single application. Hereinafter, unless otherwise noted, any reference to "stain" means both stain and coating. Non-limiting examples of finishes include varnishes, shellacs, polyurethanes, teak oil, linseed oil water-based dispersions and emulsions such as, for example, acrylic emulsions or polyurethane dispersions, and the like.

As used herein, a "transparent stain" is meant to include colored stains that are permeable to visible light and are not opaque. As used herein, a "semi-transparent stain" is meant to include colored stains that are partially transparent or are translucent, but which are not totally opaque.

A latex or emulsion stain ("latex stain") is a water-based stain ranging in viscosity from a thin liquid to a semi-solid paste and includes a resin dispersion, water, one or more pigments, colorants, tinting agents and/or metal effect agents, and other optional additives (e.g., fillers and extenders). Water-based stains typically have waterborne binders such as acrylic emulsions and water dilutable alkyds. A "latex stain" includes one step coating products such as, for example, a water-based polyurethane having a stain component.

An organic solvent-based stain ("solvent stain" or "alkyd stain") is a uniformly-dispersed mixture ranging in viscosity from a thin liquid to a semi-solid paste and includes a polymeric binder; an organic solvent carrier (such as but not limited to mineral spirits, VMP naphtha, kerosene, xylene, lacquer solvents such as acetone or other ketones, toluene or a mixture of these); one or more pigments, colorants, tinting agents and/or metal effect agents; and other optional additives (e.g., fillers and extenders). The polymeric binder can be a drying oil, natural, semi-synthetic or synthetic resin such as polyacrylate, polyurethane, modified alkyd resin or other film-forming polymer. Included as well in the binder usually is a cross-linking agent, hardener, curing agent and/or secondary resin having cross-linking ability. A "solvent stain" or "alkyd stain" includes one step coating products such as, for example, a solvent-based polyurethane having a stain component.

Typically, the stains prepared using the apparatus of the invention include a "carrier" or "vehicle." The "carrier" or "vehicle" includes the finish coating materials such as, for example, varnishes, shellacs, polyurethanes, teak oil, linseed oil and the like. As used herein, the term "carrier" or "vehicle" shall mean a binder and one or more optional thinners and other ingredients (excluding colorant agents) used to form stains.

A "pigment," is a substance that imparts color to another substance or mixture and is usually in the form of organic or inorganic dry powder. A "Colorant" is also a substance that imparts color to another substance or mixture, and generally includes at least one pigment and other additives. "Dyes" and "Tinting agents" similarly are color-imparting agents. "Metal effect agent" is an agent that imparts metallic-type luster, pearlescent effect agents and associated properties to stain films. Hereinafter, unless otherwise noted, pigment, colorant, tinting agent, dye and metal effect agent will be referred to collectively as "colorant agent."

In general, pigments are insoluble in the vehicle, whereas dyes are soluble in the vehicle. Inorganic pigments include metal oxides such as the oxides of iron, titanium, zinc, cobalt, and chrome. Various forms of carbon may be used for black pigments. Organic pigments may be derived from natural or synthetic materials, and include but are not limited to phthalocyanine, lithos, toluidine, and para red. Organic pigments may be employed in a precipitated form as a lake. Dyes are generally organic materials and include dyes such as gilsonite; acid dyes, such as azo, diazo and triarylmethane dyes; and basic dyes, such as aniline dyes. In addition, chromium salts, iron salts and cobalt salts may be used.

Pigment-based colorants are often provided in the form of "tinting concentrates" or "colorant compositions" comprising highly concentrated levels of colorant agent dispersed into a vehicle (typically further comprising a surfactant package to promote the storage stability of the composition). The amount of colorant agent used in a colorant composition is typically from about 5 weight percent to about 70 weight percent, depending on the type of colorant agent.

DETAILED DESCRIPTION

The present invention is directed to a method of color matching stains and a computerized system that permits the selection or production of a stain that when applied to a substrate closely matches a target color. The system is designed to accommodate a variety of wood species and other types of absorbent or porous substrates (e.g., engineered building materials such as grain pattern printed paper-faced boards, cement-based building materials, textured plastics, etc.).

More specifically, the present invention is directed to a method of selecting or producing (e.g., tinting a stain base) a stain that when applied to a desired substrate (e.g., a wood species) will have the same or substantially the same color as a target object. The method of the present invention may be used for both oil-based and water-based stains. The method may be used to select a particular stain from a set of pre-existing stains, or produce a stain, for example, by tinting a stain base.

In one embodiment of the present invention, a system is provided that comprises (i) a computer (e.g., a stand-alone PC or a networked computer), (ii) hardware and/or software to store a database of stain records, (iii) hardware and/or software to create or load spectral data (e.g., a digital image) of a target sample, and (iv) hardware and/or software to display images and/or process spectral data. The system preferably facilitates the selection of a desired stain, and in preferred embodiments may also include hardware and/or software to dispense colorant agents and/or vehicles to create the desired stain.

As will be discussed in more detail below, the system of the present invention may be used in (i) a "manual" mode (whereby a human compares database images to a physical specimen or to target images and then makes a selection); (ii) an "automatic" mode (whereby the computer system uses spectral data to suggest a closest match based on the selected wood species); or (iii) a "combination" mode (whereby the computer system uses spectral data to suggest a closest match and the user can then compare the suggested match with various images to achieve a final selection). In one embodiment of the manual mode the spectral data is not used. Rather, only color images are being compared.

The apparatus of the invention can be used to prepare a stain for a wide variety of species of substrates (e.g., wood) that may be included in the system. Non-limiting examples of specific wood species that may be included in the system include white oak, red oak, white pine, southern yellow pine, poplar, spruce, cherry, walnut, redwood, cedar, maple, mahogany, birch, hickory, walnut, ash, and the like. Preferably the wood species that are included in the system include at least red oak, white pine, and birch. More preferably the included wood species in the system include at least red oak, birch, cherry, maple and white pine. In addition, the system may include variations of these species (e.g., a heavily grained white oak, a moderately grained white oak, a relatively grain-free white oak, etc.). In addition, the system may include other absorbent or porous substrates such as cement- or fiber-reinforced-cement-based products, printed paper veneered building materials, etc.

In one embodiment, the invention provides an apparatus that suggests a stain formula for the selected substrate by selecting (or permitting the selection of) a formulation that will result in the closest color match from the database. The apparatus may optionally determine the closest formula by performing calculations (e.g., interpolation) to prepare a new formulation different from the closest pre-existing color match in the database.

In one embodiment, the present invention relates to an apparatus that can prepare solvent- and water-based stains for application to a specified substrate (e.g., wood species) wherein the prepared stains are visually match the target color. The apparatus of the invention uses a stain matching computer program that can analyze the color data from the target. When used in connection with wood substrates, this allows the apparatus to identify a suitable color and prepare a suitable stain to match the target color on any type of wood, or prepare a stain having the same stain color on two different species of wood, i.e., match the color on two different species of wood. For example, a stain can be prepared to match the color for oak trim to the color of a maple cabinet. The apparatus allows the "reading" of a maple stain color (target color) and, the generation of a stain color to match the oak trim to the maple color.

In one embodiment, the apparatus of the invention includes data (e.g., spectral data and/or digital color images) for a plurality of colored stains as applied to a plurality of substrates (e.g., wood species). These data may be prepared, for example, by staining various species of wood (or other substrates) with several color stains and measuring the color of the stained wood (or portions of the stained wood) and/or taking a digital color image of the stained wood. An optional topcoat, such as a clear finish may be applied to the stained wood samples. Any number of stained samples for each wood species can be prepared. For example, it may be useful to prepare from about 100 to about 400 colored samples for each included wood species. In general, having a sufficient number of included colored stained samples will facilitate the selection of a matching stain for a particular wood species.

As will be described more fully below, in one embodiment the color matching software program includes a database (or plurality of databases) containing spectral data for stain products applied to different substrates. The color matching software program also contains one or more formula(s) for wood stain composition(s) describing the required proportions of vehicle, colorant agents, and other additives.

The catalogued substrates that are used to determine the spectral characteristics of the stains preferably include panels composed of different types of woods such as the species mentioned herein.

A typical database record will contain (i) a stain formula (i.e., sufficient information to select a pre-determined stain or to produce a stain from various ingredients); and (ii) one or both of (a) a digital color image depicting how the stain would appear as applied to one or more substrates (e.g., wood species), and (b) spectral data associated with the stained substrate (e.g., spectral data representing the color of the stained wood or portions thereof).

The database may be assembled in a variety of ways. In one embodiment, a series of known stain formulas are applied to a variety of different wood species. The stained wood samples are then imaged or measured. In this embodiment, it is likely that the different wood types will yield a palette of colors that differ. However, it is also possible that similar colors may be found in the palette (i.e., formula A on wood species I may produce a similar color to Formula B on wood species II). In another embodiment, a palette of colors is created using a single species of wood and a colorist then uses a trial-and-error methodology to "match" those colors on other wood species by adjusting the formulas. In this case, the color palette will be uniform, but the formulas to achieve those colors will vary depending on the wood species selected. A combination of these two methods may also be used to create the database. Preferred databases have sufficient breadth of information to assist a user in finding the right formula of stain for the desired color and substrate.

Preferred systems for creating a digital image of a stained panel include (i) a camera (preferably a digital camera) and optional light source or (ii) a digital scanner. Care should be taken when creating a digital color image of a stained panel to ensure that the stored and/or depicted color of the image accurately reflects the perceived true color of the panel. The choice of lighting used during image capture may be of some importance in this regard.

If desired, the panel image may be taken under the same conditions as an associated image of a color reference. For example, the panel may be placed adjacent one or more standard color reference panels. This would ensure that the panel and the reference panel images are exposed to the same conditions and the captured colors of the panel image may be suitably corrected, if necessary, using standard color correction algorithms (i.e., a correction may applied to correct the reference image to its true color and the same correction may be then applied to the panel image). This same technique may be used when measuring the image of a target panel. Preferably, the database panel images and the target panel images should reflect similar imaging processes. When wood panels are being compared it is also desirable to use a similar magnification power. This will make the grain patterns appear roughly the same size and avoid any potential perception bias that may be introduced by differences in grain size appearance.

The digital color image of a stained panel (of either the database images or the target image) may then (or later) be analyzed. Spectral data of various portions of the image may be cataloged or calculated. As described in the 1991 National Forest Products Association brochure, a tree typically goes through two distinct periods of growth, resulting in two bands called "earlywood" (sometimes referred to as "springwood") and "latewood" (sometimes called "summer wood"). The earlywood is generally lighter and less dense than latewood and these two portions accept stain at a different level. It has been discovered that the portions of the image that depict "earlywood" may be particularly important in the perception of the overall "match." Consequently, in preferred methods the spectral data from the earlywood regions are particularly interesting. The color data from these regions may be sampled on a pixel-by-pixel basis, if desired. Alternatively, a digital filter may be applied to the image (or a portion of the image) to capture the desired data. In one embodiment, the pixel colors are analyzed and statistically processed to capture the desired data. For example, a histogram of the color data values may be prepared and the light "earlywood" regions identified.

In one embodiment, the digital color image is taken with a light source that will represent the target under the desired lighting conditions that is most suitable for a realistic match. If desired, databases that represent the stain colors under different lighting conditions (e.g., indirect daylight, fluorescent, etc.) may be stored and the desired "match conditions" selected by the user. In addition, databases that represent the stain colors and a variety of topcoat finishes may be stored and the user may select the desired topcoat finish.

As an alternative, suitable "synthetic" digital images may be produced to populate the database. In this embodiment, a digital image of a wood panel is created and "colored" appropriately to represent how the particular species of wood would look when stained with a given stain. One advantage of this method of populating the database is that fewer images need to be taken and the user will see the stain as applied to the same piece of wood. In other words, the same grain pattern will be displayed no matter what color stain is selected. This will help eliminate bias that might be introduced if different grain patterns are shown. One method of achieving this database is to select those portions (e.g., those pixels) of the image that comprise the light earlywood color and color them with the appropriate color for that type of wood. The dark latewood portions can be appropriately colored for each record image.

Suitable cameras for use in the present invention include analog or digital cameras such as are manufactured by a wide variety of companies. Digital cameras are preferred as their use eliminates the need to process a film and/or convert the film image to digital information. If desired, the cameras may be fitted with a flash device, preferably a flash that is color balanced with the detector. In one embodiment the flash device is in the form of a ring around the lens. See, e.g., the Kodak DX7590 camera. This enables the flash to uniformly illuminate a target and not cast shadows of create uneven illumination of the target.

Suitable such scanners include high quality color "flatbed" scanners that are available from a variety of companies.

If desired, the system may optionally include a spectrophotometer suitable for measuring spectral data of stained wood. Suitable spectrophotometers include a device for separating light into its component wavelengths, such as a diffraction grading or a prism, and an array of detectors to measure the intensities of the different wavelengths. This type of device is often used for color identification and there are suitable models available, which are designed to identify colors. Examples of suitable spectrophotometers include the CF-57U, CF57 (45°/0°) or CFS57 (sphere D/8°) countertop spectrophotometer (available from Match-Rite). Other examples of suitable spectrophotometers include Datacolor SF-350 and SF-600 spectrophotometers.

The spectrophotometers used for color matching are usually designed to simulate the human eye's system of rods and cones that are used to perceive a color. As a result, the paint industry has typically used three-dimensional mathematics to define color space. These variables are often referred to as (Hue, Value and Chroma), (Hue, Brightness, and Saturation), (x, y, and z), and other descriptive names depending upon the author. Most color matching programs use this system of three-dimensional mathematics to read, record, and create a color database. These programs can be static, in that they provide a close match to a color offered by a paint company, or interpretive, so that the system actually develops a color formula based on complex calculations as to the effect each colorant has on the final color of a paint or stain.

Typical spectrophotometers for use in measuring paint colors employ a 2 cm diameter spot size. It should be recognized that when this spot size is used on a stained wood specimen the measured color is an aggregate of the colors in that entire area. While this has been appropriate when measuring a uniform paint film, it has been discovered that aggregating such a large area can for some wood species introduce errors in the data (i.e., the dark latewood regions tend to darken the overall measured color, thereby resulting in a "false" match). To avoid these problems a smaller spot size (e.g., 8 mm diameter or less) can be selected and the spot positioned over an earlywood region of the wood panel that avoids the dark latewood portions.

The spectral characteristics of the stains (as applied to certain catalogued wood substrates) may be determined and stored in the computer databases using one or more of the following methods. In one embodiment, the spectral characteristics of the applied stains are determined from reflectance measurements using the Kubelka-Munk Theory. The measurements can be average values over a broad area (recognizing the limitations discussed above), or may be measurements over smaller selected areas of the stained wood (e.g., an area that does not contain late wood). Alternatively, as previously mentioned, the spectral characteristics of the applied stains may be calculated by analysis of the digitized images. In this later case, one or more pixels is analyzed and the color data is determined for the selected pixel or pixels.

The system of the present invention preferably contains a color monitor. This monitor is required when the system is being used in the "manual" or "combination" modes. In typical embodiments, the target panel image is displayed on the monitor adjacent to one or more database images. The user is then able to view the images and select or confirm an acceptable match. It is preferred that the monitor itself displays the colors of the images accurately. Of course, small errors in the monitor's depiction of the images may be tolerated as both images, database and target, will be similarly biased. Monitor calibration accuracy can be improved using known calibration equipment or techniques. One suitable system for calibrating a monitor is the HUEY—COLOR ME ACCURATE system available from Pantone.

One preferred desired output of the system is the selection or production of a stain. If the target panel is close in color to an existing stain product, then the system can simply recommend the existing stain product. If the target is not acceptably close to a pre-existing stain, then in preferred embodiments, the system will provide instructions how to mix an acceptable stain. In one embodiment, the system outputs a stain formula. This may be a list of base and colorant compositions that should be mixed together to yield the stain. Alternatively, the system may simply transmit the information directly to a tinting machine that will then dispense the colorant compositions and/or stain base to produce the desired stain product.

Suitable tinting machines are available from Fluid Management (e.g., the Series 7000 machine), Dromont, Corob, or the like.

The invention can use any colorant agents available for preparing stains known in the art. These include colorant agents known in the art such as, for example, dyes or pigments (organic or inorganic). Inorganic pigments include metal oxides such as the oxides of iron, titanium, zinc, cobalt, and chrome and can include mineral pigments obtained from clay. Non-limiting examples of pigments include titanium dioxide white, carbon black, lampblack, black iron oxide, red iron oxide, transparent red oxide, yellow iron oxide, transparent yellow oxide, brown iron oxide (a blend of red and yellow oxide with black), phthalocyanine green, phthalocyanine blue, organic reds (such as naphthol red, quinacridone red and toluidine red), quinacridone magenta, quinacridone violet, DNA orange, and/or organic yellows (such as Hansa yellow). Organic pigments are usually derived from natural or synthetic materials. Organic pigments may be employed in a precipitated form such as, a lake. Dyes are usually organic materials and include dyes such as gilsonite; acid dyes, such as azo, diazo and triarylmethane dyes; and basic dyes, such as aniline dyes.

In one embodiment, the colorant agents can be universal colorant compositions, which can provide a single set of colorant formulations for use with solvent- and water-based stains. These colorant compositions are uniform and do not require mixing prior to use, even after extended shelf-life. See, e.g., U.S. provisional application, Ser. No. 60/663,040, which is incorporated herein by reference. The typical "shelf-life" for these colorant compositions is about two years.

The colorant agents for practicing the present invention can be obtained in any form known in the art. Suitable containers for use with colorant compositions include cans, bottles, pouches, tubes, syringes, and caulking-type cartridges. In a specific embodiment the colorant compositions can be provided in sealed pouches wherein the colorant composition can be readily dispensed in controlled amounts. More preferably, the sealed pouches or containers have a nozzle or adapter orifice that facilitates clean entry of the composition into the tinting machine. In one embodiment the pouches are provided in boxes for ease of storage and use.

Suitable hardware/software for use in the present invention may take many forms. In general, as used herein a reference to "software" should not be interpreted to exclude or preclude the use of a hardware device that is designed to accomplish the same process. For example, image-processing tasks may be handled by software algorithms or in hardware.

Preferred systems of the present invention are designed to input a target panel image. In one embodiment, the image is taken using a camera or scanner and digital data reflecting the image is input to the system. The camera or scanner may be physically connected to the system, networked to the system or detached from the system. In the later case, the image data may be provided to the system by appropriate file transfer methods.

The system preferably should be capable of displaying the target panel image and one or more database images on a color monitor. This capability is required for "manual" or "combination" mode operation. Typically the system will permit the user to specify the substrate (e.g., wood species) that the stain will be applied to. The selection of the substrate will be used by the system (e.g., in the display of database images on that substrate) in the color matching process. In addition, the user may be able to specify the lighting most appropriate to the target panel.

The system is preferably configured to permit the manipulation of database and/or target images. In one embodiment, the system displays a side-by-side comparison of the target panel image next to a database image. The user is then able to scroll through various database images to find the best "match."

In another embodiment, the system is configured to display an array of database images surrounding the target panel image. The user can use the visual clues of the array to better steer through the array and find the closest "match."

In yet another embodiment, the system provides "tools" to enable the user to find other suitable database images. For example, a side-by-side display of the target panel image and a database image might be presented. Tools that permit the user to find other images (e.g., lighter-darker; more red-less red, more green-less green, more grain-less grain, etc.) are included. By clicking on the selections the user can be shown other database images that better match the target panel image.

In yet another embodiment, the system is configured so that more than one database image may be selected as "matches." For example, the user may decide that the best color is somewhere between database image X and Y. The system may be configured to then calculate a formula that is a blend of formulas X and Y.

Once a database image (or images) is selected, the system preferably provides a stain formula (either as a printout or as directions to an associated tinting machine).

In the "combination" mode the system uses spectral data (either from the digital images or from an associated spectrophotometer scan) to help guide the user to the best match. In one embodiment, the most appropriate regions of the database images are compared to the most appropriate regions of the target panel image. To obtain the most appropriate regions of the target panel image the user may be guided to select the appropriate region or filters may be applied to the entire image to assist or direct that process. For example, in one embodiment, the target panel image is displayed on the monitor and the user is permitted to select those pixels that he or she would like to match. Alternatively, the computer system can highlight the best regions and get confirmation of this selection from the user.

In another embodiment, if the color of an applied stain (first stain), as applied to the selected species, is not correct, the apparatus can be used to adjust the color of the first stain on the selected species by comparing the color of the stained substrate after the first stain has been applied to the target color and dispensing additional ingredients required to obtain the desired color. Alternatively, if the original stain color, as applied to the selected substrate, cannot be modified (e.g., by adding additional colorants) to prepare a new stain color, the color information can be used to modify the original formulation and prepare a second stain color.

FIGURES

Figure 1A:
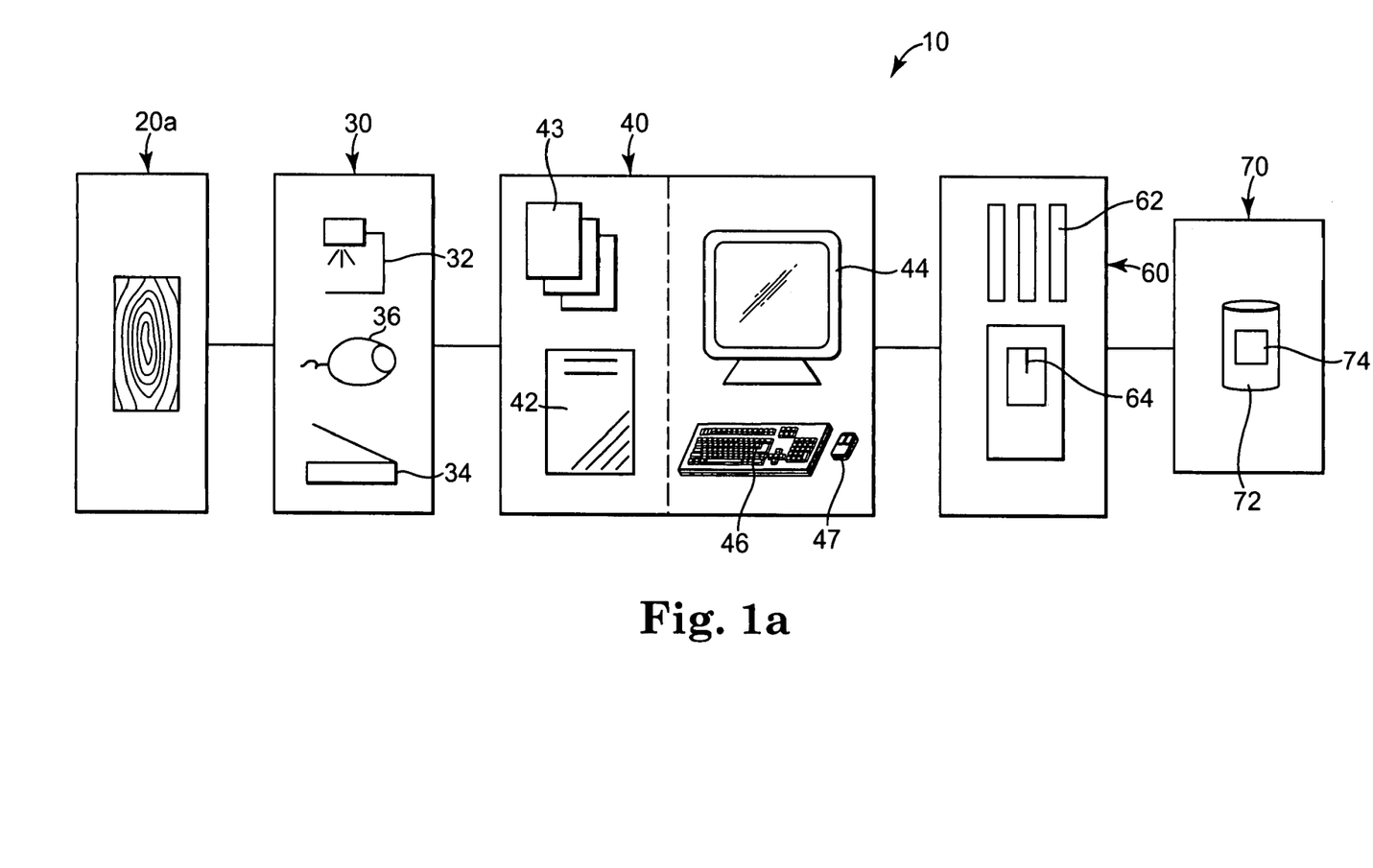

FIG. 1a depicts one possible configuration of the system of the present invention. In this depiction, system 10 consists of data collection device 30 for measuring a target object 20a, computer system 40 and optional tinting machine 60. A suitable data collection device 30 may include cameras 32, scanners 34, spectrophotometers 36, and/or file transfer devices 38 (not shown). In preferred embodiments the system includes a digital camera or scanner. As illustrated, the computer system 40 includes a processor 42, monitor 44, keyboard 46, and pointing device (e.g., mouse) 47. The computer system also includes or is connected to a storage device (not shown) housing database records 43. The computer system components may be physically connected (e.g., by wires) or the components may be interconnected using wireless technology. Combinations of wired and wireless connections may be used. In addition, one or more of the devices used to form computer system 40 may be a networked device.

Any suitable tinting machine 60 may be utilized. Typical machines include one or more ingredient reservoirs 62 and a dispenser 64. The machine should be capable of delivering known quantities of various ingredients. Preferred systems are in communication with the computer system 40, but "stand-alone" systems and "manual" systems may also be used. In such instances the desired stain formula information output from the computer system 40 is used to produce the desired stain.

As illustrated in FIG. 1a, a stained substrate (e.g., wood panel) is measured and/or imaged using the data collection device 30. The data is then transmitted to the computer system 40. In the case where the stained substrate is made using a known stain formula the formula data information is associated with the spectral data from the data collection device(s). In the case of the target panel, the data from the data collection device is transmitted to the computer system for use in the matching process. A stain product 70 is selected or produced using the system 10 and placed into a suitable container 72. If desired, a printer (not shown) may be used to create a label for the container.

Figure 1B:
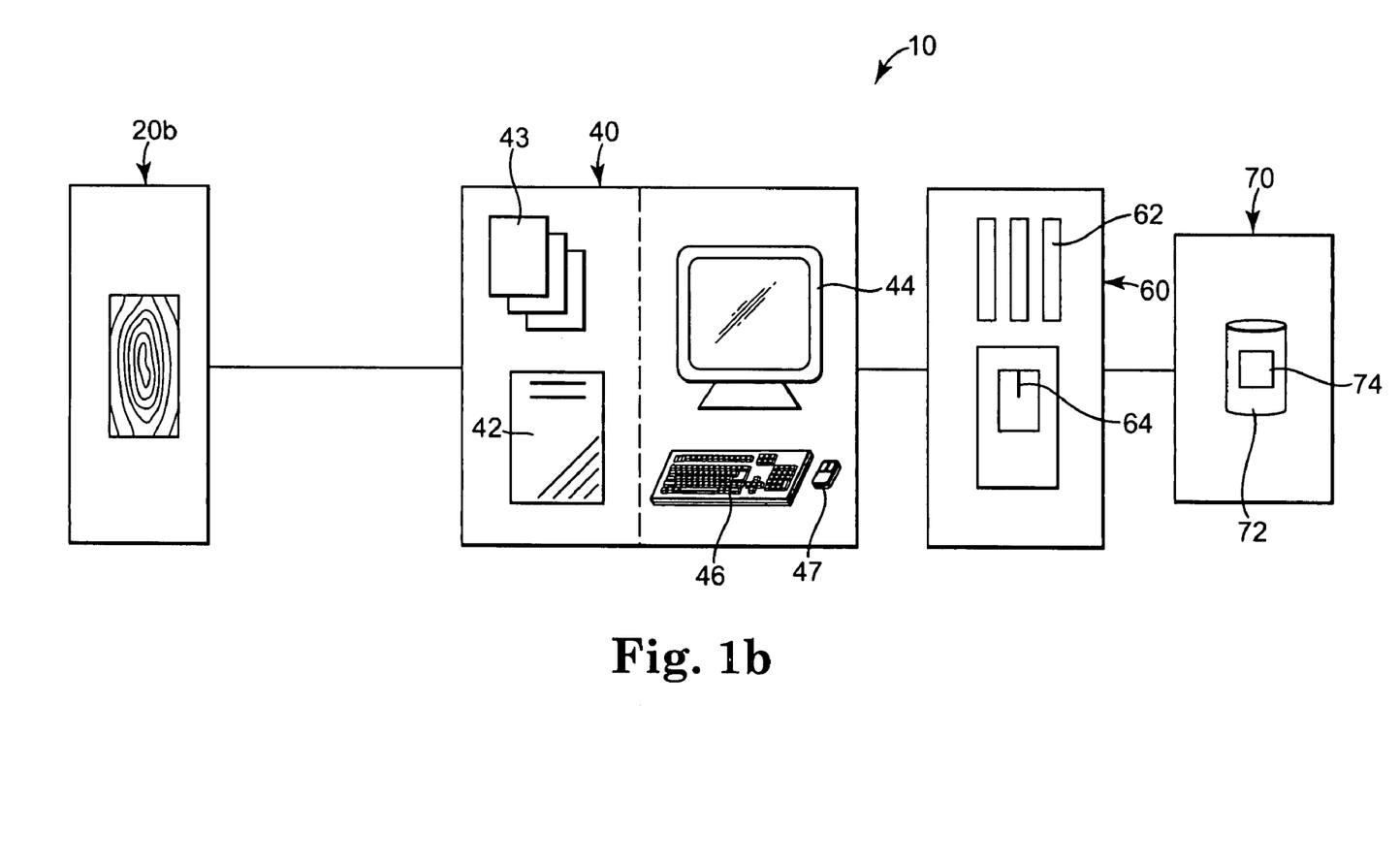

FIG. 1b depicts another possible configuration of the system of the present invention. In this depiction, system 10 consists of computer system 40 and optional tinting machine 60. As illustrated, the computer system 40 includes a processor 42, monitor 44, keyboard 46, and pointing device (e.g., mouse) 47. The computer system also includes or is connected to a storage device (not shown) housing database records 43. In this configuration, a target panel 20b may be held adjacent the monitor and a comparison of the panel with one or more images may be made by a user.

Figure 2:
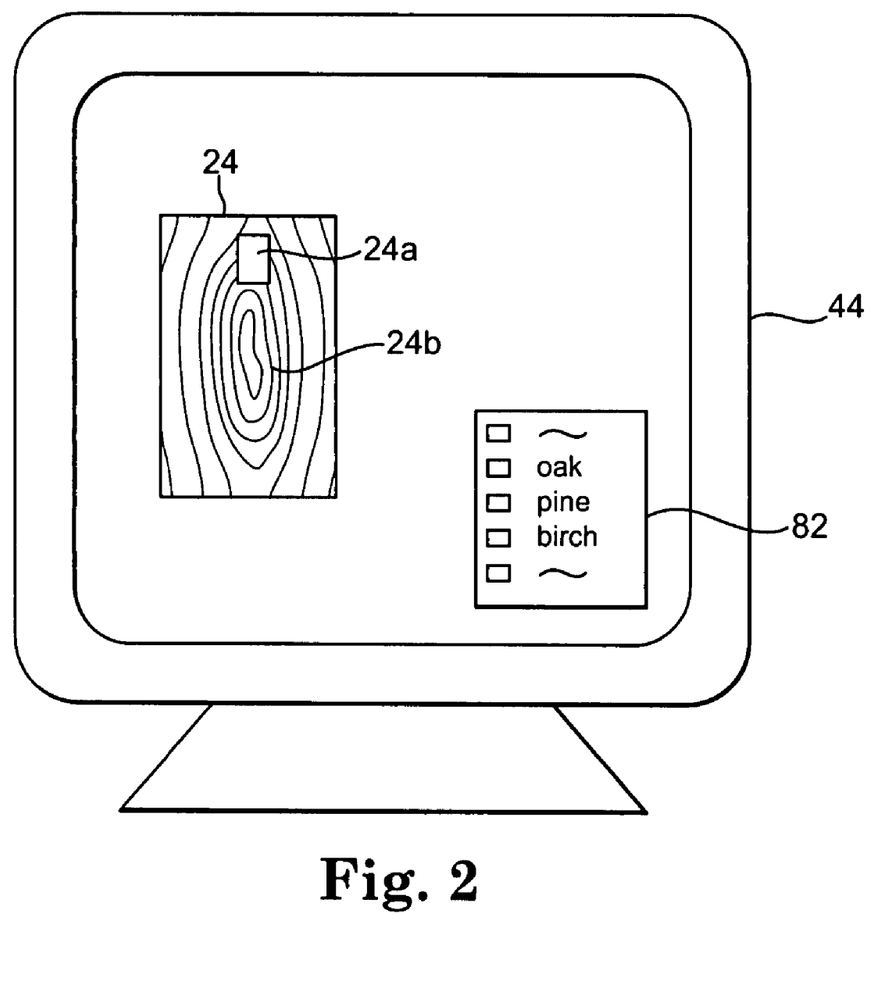

FIG. 2 depicts monitor 44 at an illustrative point in one possible process of the present invention and illustrates how information might be presented to and/or manipulated by the user. In this illustrative embodiment, an image 24 is displayed on the monitor. The image 24 is a color depiction of a stained wood panel having grain lines 24b. A region 24a of the image may be selected by the system or by the user (e.g., using a pointing device 47). The selected region may be one or more pixels of the image. The system may be configured to calculate or assemble spectral data regarding the selected region. Further illustrated is a menu 82 of substrates (e.g., wood species) that may be selected by the user.

Figure 3:
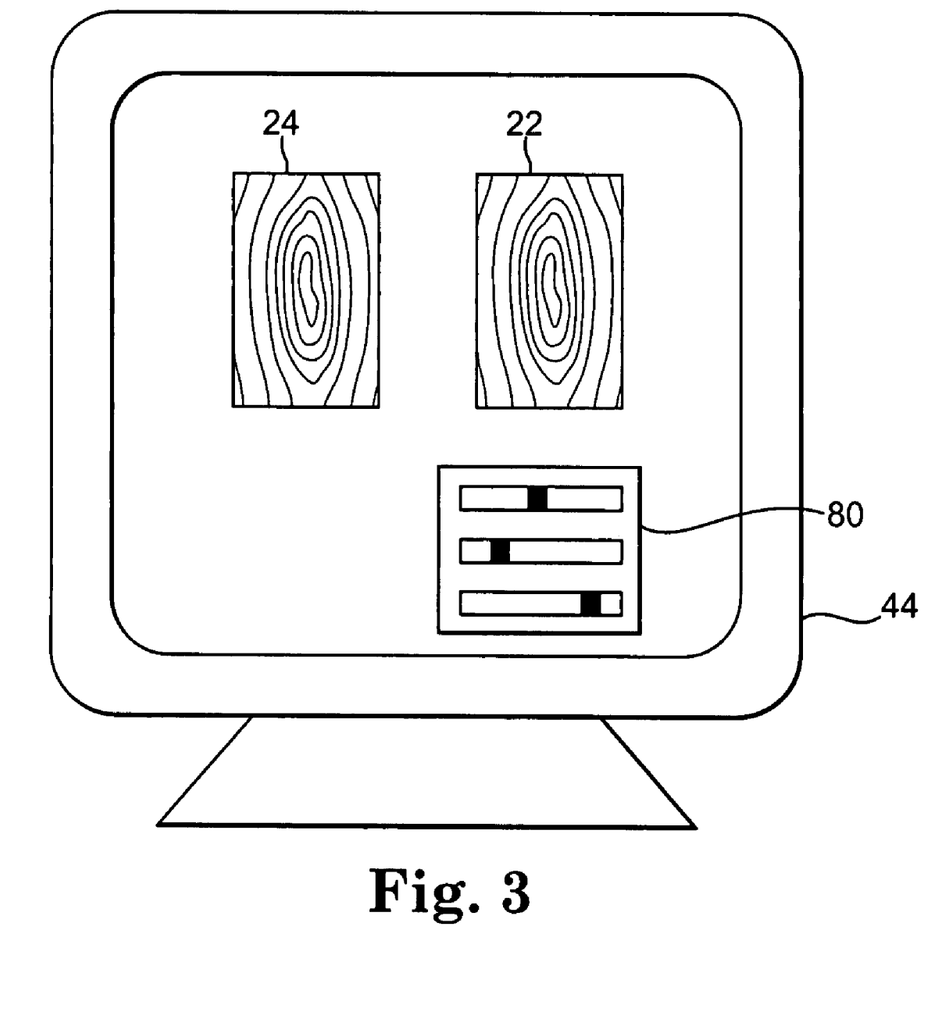

FIG. 3 depicts monitor 44 at an illustrative point in another possible process of the present invention and illustrates how information might be presented to and/or manipulated by the user. In this illustrative embodiment, images 22 and 24 are displayed on the monitor in a side-by-side fashion. Image 24 is a color depiction of a target stained wood panel and image 22 is a color depiction of a first database stained wood panel. A software enabled graphical tool 80 is illustrated, whereby the user may conveniently adjust the database image or select alternative database images. For example, if the first database image is too "red", the user may slide a scroll bar in the direction of less red and the image will be adjusted or replaced with another database image that is less red than the first image.

Figure 4:
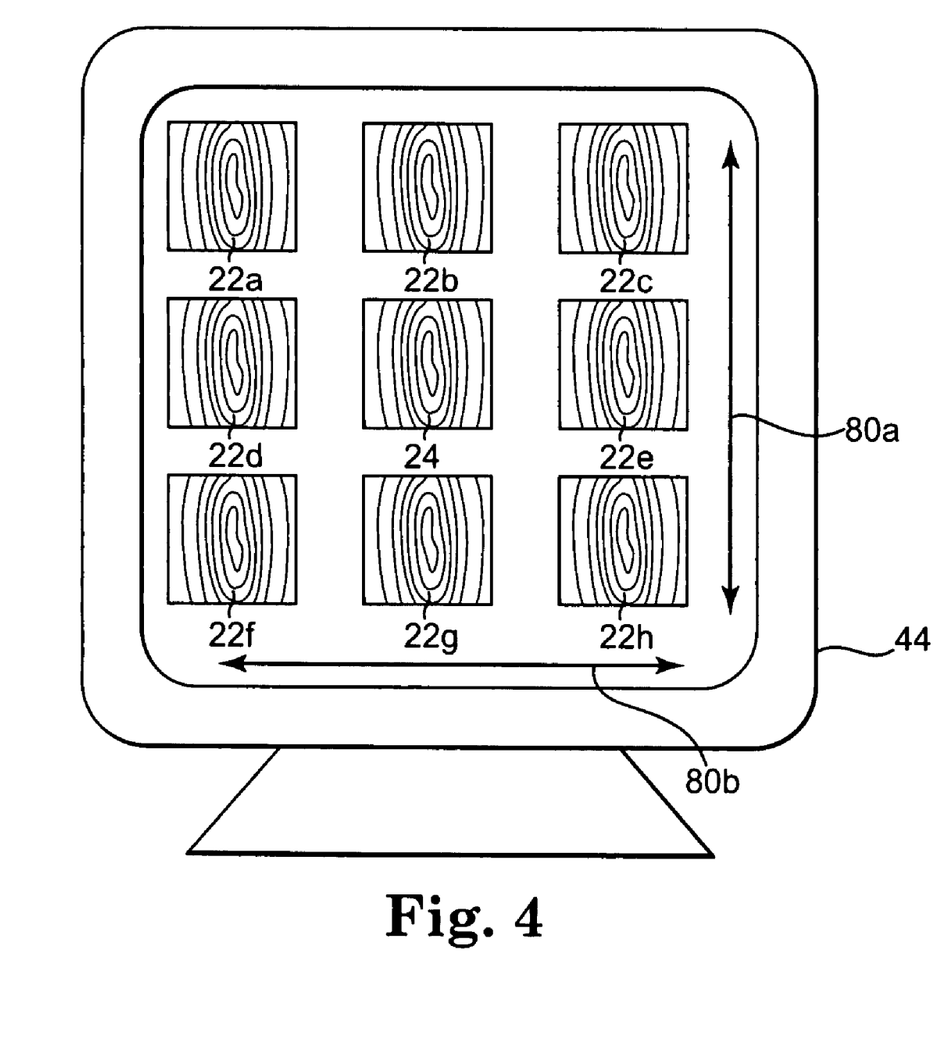

FIG. 4 depicts monitor 44 at an illustrative point in another possible process of the present invention (e.g., at a similar point in the process to that discussed in FIG. 3). However, in this illustration, the target image 24 is displayed among an array of database images (22a-22h). Software enabled graphical tools 80a and 80b are illustrated, whereby the user may conveniently select alternative database images. For example, if the displayed database images are too "red", the user may slide a scroll bar in the direction of less red and the images will be scrolled to a new less red region of the array.

It is noted that many different graphical representations of colored panels may be displayed. The illustrative examples depicted herein are only a small subset of the ways that are described by this invention.

The merits of the apparatus for preparing the stains of the present invention are further illustrated in the following examples.

EXAMPLES

Example 1

A stain is applied to a suitable sample of white pine. The stain is allowed to cure and a finish coating, e.g., polyurethane or varnish is applied. After the finish coating has dried the finished color is optionally analyzed by a spectrophotometer and the color readings recorded in the database.

A digital image of the aforementioned sample is taken using controlled lighting conditions. Care is taken to ensure that the image accurately reflects the true color. The image may be taken, for example, using a digital camera or a scanner.

This process is repeated for another shade and the data added to the database. The process is repeated until a sufficient number of colors for white pine are recorded in the database.

Example 2

A stain is applied to a suitable sample of red oak. The stain is allowed to cure and a finish coating, e.g., polyurethane or varnish is applied. After the finish coating has dried the finished color is optionally analyzed by a spectrophotometer and the color readings recorded in the database.

A digital image of the aforementioned sample is taken using controlled lighting conditions. Care is taken to ensure that the image accurately reflects the true color. The image may be taken, for example, using a digital camera or a scanner.

This process is repeated for another shade and the data added to the database. The process is repeated until a sufficient number of colors for white pine are recorded in the database.

Example 3

The process described in Examples 1 and 2 can be repeated for any wood species (or other porous or absorbent substrate) to be stained and stored in the database.

Example 4

A stain is applied to a suitable sample of white pine. The stain is allowed to cure and a finish coating, e.g., polyurethane or varnish is applied. After the finish coating has dried the finished color is analyzed by a spectrophotometer. This process is repeated for another stain shade. The process is repeated until a sufficient number of colors for white pine are determined.

The color of untreated white pine is then is analyzed by a spectrophotometer. The color readings of untreated pine are subtracted from the color readings of the stained samples.

Alternatively, the stain can be applied to a neutral (e.g., white) substrate. The stain is allowed to cure and a finish coating, e.g., polyurethane or varnish is applied. After the finish coating has dried the finished color is analyzed by a spectrophotometer. The neutral stain color data, representing the actual color of the stain alone, is then recorded in the database.

Other species of wood are analyzed by a spectrophotometer in a similar manner and the data for the colors of the unstained wood species are also recorded.

After the target color is determined, the ingredients required for preparing a stain color to match a target color to the selected species of wood are calculated using the data for the neutral stain colors and the unstained wood color.

Example 5a

A target color is analyzed by a spectrophotometer. The processor is used to determine the closest colors (e.g., two) of stain in the database. The processor calculates the proper formula for the stain by interpolating between the closest stain colors and their formulas. This process can be used for either color data for specific species or for neutral stain color data combined with the unfinished wood color data to determine the finished stain color.

Example 5b

A target color is imaged. The user or the system selects the closest colors (e.g., two) of stain in the database. The processor calculates the proper formula for the stain by interpolating between the closest stain colors and their formulas.

Example 6

A target color is analyzed by a spectrophotometer and/or imaged. The system is used to determine the closest of stain color in the database. The apparatus prepares the stain color having the formula. This process can be used for either the color data for specific species, or for neutral stain color data combined with the unfinished wood color data to determine the finished stain color.

The above specification, examples and data provide a complete description of the manufacture and use of the composition of the invention. Since many embodiments of the invention can be made without departing from the spirit and scope of the invention, the invention resides in the claims hereinafter appended.

All patents, patent applications, and literature cited in the specification are hereby incorporated by reference in their entirety. In the case of any inconsistencies, the present disclosure, including any definitions therein will prevail.

What is claimed is:

1. A method, comprising the steps of:
    A) providing a computer system that includes or is connected to a database of stain information, wherein the database contains a plurality of records associated with a plurality of colored stains, each record including:
        (i) data representing a transparent or semitransparent wood stain, and
        (ii) at least one of:
            (a) a first digital color image depicting the stain or
            (b) first spectral data for the stain as applied to an earlywood region of one or more substrates having or depicting earlywood and latewood regions;
    B) obtaining at least one of:
        (i) a second digital color image of or
        (ii) second spectral data for an earlywood region of a target object having or depicting earlywood and latewood regions; and
    C) selecting a desired stain for a substrate to be stained by comparing an earlywood portion of at least one of the second digital color image or second spectral data to a first digital color image or first spectral data from one or more of the database records.

2. The method of claim 1, wherein the computer system comprises a color monitor; and the method further includes the step of:
    D) displaying on the monitor:
        (i) at least one second digital color image of a target object or color image representing second spectral data for the target object; and
        (ii) at least one first digital color image or color image representing first spectral data of a database record.

3. The method of claim 2, wherein the method includes the step of:
    E) permitting a user to select at least one desired image from the displayed database record images.

4. The method of claim 2, wherein the computer system displays an array of color images, thereby allowing a user to view at least two first digital color images or color images representing first spectral data and the second digital color image or color image representing second spectral data at the same time.

5. The method of claim 2, wherein the computer system permits a user to adjust the display of the second digital color images or color images representing second spectral data.

6. The method of claim 5, wherein the adjustment comprises the user selecting other images from an array.

7. The method of claim 5, wherein the adjustment comprises the user adjusting the color of an image.

8. The method of claim 1, wherein the database contains a plurality of records associated with stains, including first digital color images depicting the stains as applied to one or more species of wood.

9. The method of claim 8, wherein the species of wood include at least red oak, birch, and white pine.

10. The method of claim 8, wherein the species of wood include at least red oak, birch, cherry, maple and white pine.

11. The method of claim 10, wherein the system includes variations in grain patterns for the species.

12. The method of claim 1, wherein the database contains a plurality of records associated with stains, including first digital color images depicting the stains as applied to a region comprising a depiction of earlywood on one or more absorbent or porous substrates selected from the group consisting of cement- or fiber-reinforced-cement-based products and printed paper veneered building materials.

13. The method of claim 1, wherein the method includes the step of:
F) tinting a stain base to produce the selected desired stain.

14. The method of claim 13, wherein the desired stain is selected by interpolating among stains from two or more database records.

15. The method of claim 1, further comprising the steps of:
G) applying the selected desired stain to the substrate to be stained to create a first sample;
H) obtaining at least one:
(i) third digital color image of the first sample or
(ii) third spectral data for the first sample;
I) using at least one third digital color image or third spectral data to assess whether the appearance of the first sample is within acceptable tolerance; and
J) if the appearance is out of acceptable tolerance optionally selecting a second desired stain.

16. The method of claim 1, wherein the computer system compares first and second spectral data to select the desired stain.

17. The method of claim 16, wherein the computer system displays a color image of the selected stain as it would appear on the substrate to be stained.

18. The method of claim 1, wherein obtaining second spectral data for an earlywood region of a target object comprises the steps of:
(K) displaying a second digital color image of the target object,
(L) selecting those portions of the image for which second spectral data is desired, and
(M) processing the second spectral data for the selected portions.

19. The method of claim 18, wherein the target object is a wood panel and the selected portion of the image represents an earlywood region of the panel.

20. The method of claim 1, further comprising obtaining first spectral data for a database record by:
(N) displaying a digital color image depicting the stain as applied to a substrate,
(O) selecting those portions of the image for which first spectral data is desired, and
(P) processing the first spectral data for the selected portions.

21. The method of claim 20, wherein the digital color image depicts the stain as applied to a wood panel and the selected portion of the image represents an earlywood region of the panel.

22. The method of claim 1, wherein the data specifies colorants and vehicles used to make a stain formula.

23. The method of claim 1, wherein the first digital color image or first spectral data is obtained over an area that does not contain or depict latewood.

24. The method of claim 1, wherein the database stores lighting conditions during image or spectral data capture.

25. The method of claim 1, further comprising specifying a substrate to be stained.

26. A method, comprising the steps of:
(A) providing a computer system comprising a color monitor, the computer system including or being connected to a database of stain information, wherein the database contains a plurality of records associated with a plurality of colored stains, each record including:
(i) data representing a transparent or semitransparent stain, and
(ii) at least one of:
(a) a first digital color image depicting the stain or
(b) first spectral data for the stain as applied to an earlywood region of one or more substrates having or depicting earlywood and latewood regions;
(B) selecting a substrate to be stained;
(C) displaying on the monitor at least one first digital color image or color image representing second spectral data for a stain as applied to the selected substrate; and
(D) selecting a desired stain by comparing a target object to the displayed image.

27. The method of claim 26, wherein the substrate to be stained is a wood species.

28. The method of claim 26, wherein the first digital color image or first spectral data is obtained over an area that does not contain or depict latewood.

29. The method of claim 26, wherein the database stores lighting conditions during image or spectral data capture.

30. An apparatus, comprising:
a computer system that includes or is connected to a database of stain information, wherein the database contains a plurality of records associated with a plurality of colored stains, each record including:
(i) data representing a transparent or semitransparent stain, and
(ii) at least one of:
(a) a first digital color image depicting the stain or
(b) first spectral data for the stain as applied to an earlywood region of one or more substrates having or depicting earlywood and latewood regions; and
a device for displaying at least one first digital color image or a color image representing first spectral data.

31. The apparatus of claim 30, further comprising a device for obtaining at least one of (a) a second digital color image of a target object and (b) second spectral data for the target object.

32. The apparatus of claim 31, wherein the computer system is configured to suggest or facilitate the selection of a formula for a stain as applied to a specified substrate by comparing at least one of (a) the second digital color image of the target object and (b) the second spectral data for the target object to the database records associated with the specified substrate.

33. The apparatus of claim 31, wherein the specified substrate is a wood species.

34. The apparatus of claim 30, further comprising a device for dispensing colorants or vehicles to create a desired stain.

35. The apparatus of claim 30, wherein the first digital color image or first spectral data is obtained over an area that does not contain or depict latewood.

36. The apparatus of claim 30, wherein the database stores lighting conditions during image or spectral data capture.

* * * * *